US008813531B2

(12) United States Patent
Burns et al.

(10) Patent No.: US 8,813,531 B2
(45) Date of Patent: *Aug. 26, 2014

(54) ASSEMBLY FOR ASSISTING THE REMOVAL FROM STORAGE AND TRANSFER OF WIRE

(71) Applicant: Alcotec Wire Corporation, Traverse City, MI (US)

(72) Inventors: Thomas W. Burns, Traverse City, MI (US); Todd W. Petters, Traverse City, MI (US)

(73) Assignee: Alcotec Wire Corporation, Traverse City, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/097,066

(22) Filed: Dec. 4, 2013

(65) Prior Publication Data

US 2014/0091070 A1    Apr. 3, 2014

Related U.S. Application Data

(63) Continuation of application No. 12/931,007, filed on Jan. 21, 2011, now Pat. No. 8,635,896.

(51) Int. Cl.
*B21D 3/02* (2006.01)
*B21F 1/02* (2006.01)
*B23K 9/133* (2006.01)
*B23K 9/12* (2006.01)

(52) U.S. Cl.
CPC ............... *B23K 9/1333* (2013.01); *B23K 9/125* (2013.01); *B23K 9/1336* (2013.01); *B21F 1/02* (2013.01)
USPC ............................................ 72/164; 140/147

(58) Field of Classification Search
CPC .............. B21F 1/00; B21F 1/02; B21F 1/023; B23K 9/125; B23K 9/1336
USPC ................ 72/160, 162, 164, 165, 183, 366.2, 72/365.2; 140/147
See application file for complete search history.

(56) References Cited

U.S. PATENT DOCUMENTS

| | | | | |
|---|---|---|---|---|
| 3,595,277 A | * | 7/1971 | Lefever | 140/147 |
| 4,464,919 A | * | 8/1984 | Labbe | 72/162 |
| 4,949,567 A | * | 8/1990 | Corbin | 72/164 |
| 6,006,573 A | * | 12/1999 | Van Merksteijn | 72/160 |

* cited by examiner

*Primary Examiner* — Debra Sullivan
(74) *Attorney, Agent, or Firm* — Kacvinsky Daisak Bluni PLLC

(57) ABSTRACT

An assembly for moving wire from one point to a second point distant from the first point. The assembly comprises a first unit comprising a wire straightener and a second unit that moves the wire through the assembly.

19 Claims, 1 Drawing Sheet

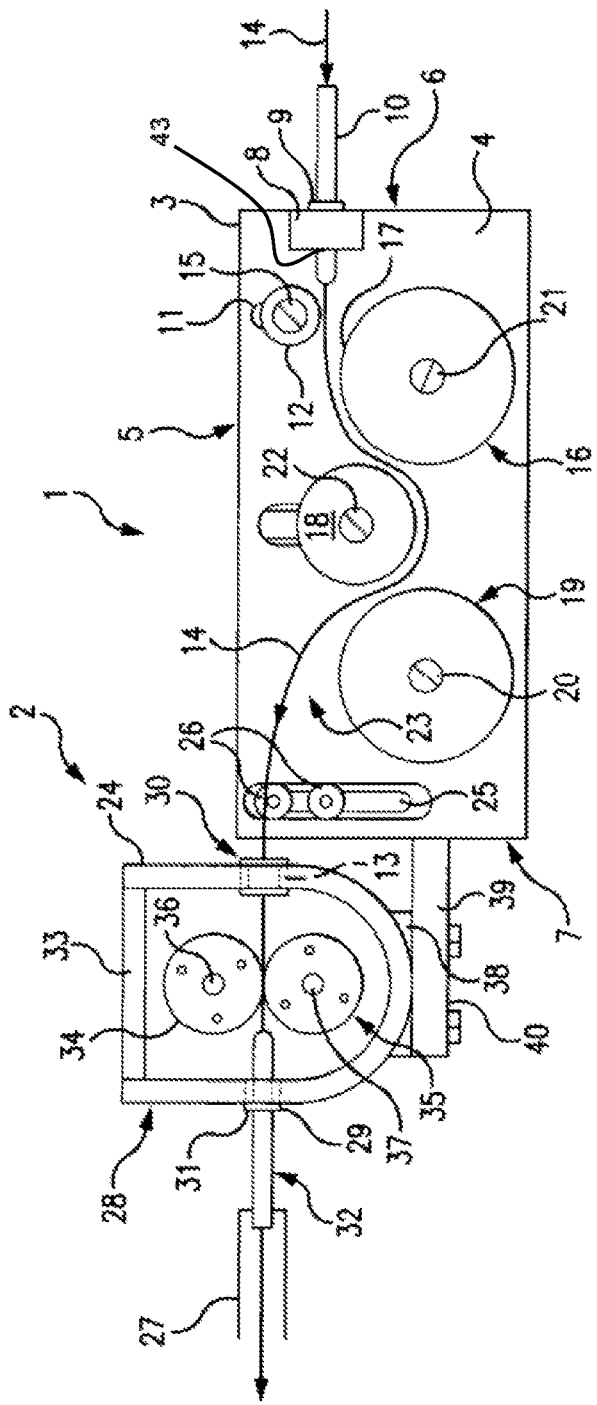
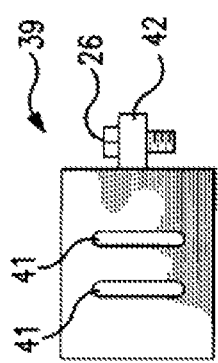
FIG. 1
FIG. 2

ASSEMBLY FOR ASSISTING THE REMOVAL FROM STORAGE AND TRANSFER OF WIRE

CROSS-REFERENCE TO RELATED APPLICATIONS

This is a continuation of pending U.S. non-provisional patent application Ser. No. 12/931,007, filed Jan. 21, 2011, the entirety of which application is incorporated by reference herein.

FIELD

This invention deals with an apparatus that is useful to solve a major problem in handling coiled wire. Coiled wire is commercially packed, shipped and stored in a coiled configuration, most of the time using a storage container.

BACKGROUND

As a consequence, it takes on a certain cast to the metal such that when the wire is uncoiled for use, it forms a sine wave in configuration and if the wire is not handled correctly, this sine wave configuration (the cast of the wire) can become helical in nature and can lead to snarled, crimped, or bent wire.

In use for welding, where the wire is fed to a welding gun, the wire enters the gun through the rear of the gun and is subjected to electrical energy wherein it melts and is placed into channels in the metal to be welded to form a weld bead.

In cases where only short segments of the wire are needed, the cast of the wire does not ordinarily make a difference, but where long weld beads are required, the wire has to be controlled before entering the welding gun.

If not controlled, the wire, upon leaving the tip of the welding gun, and before it is melted, typically bends in any given direction and does not lay into the channel to form the bead. Thus, one is forced to use short segments of wire (which do not retain the cast of the coiled wire), or the wire is short enough that it can be hand bent to get rid of the wire cast and provide a straight piece of wire.

Even in longer segments, the wire, if not controlled, tends to re-coil, that is, attempts to resume its original cast, or bends out of linearity and causes disruptions in the equipment, which causes a disruption of the welding process and a possible shutdown of the equipment for repair. It also provides snarled and bent wire which is useless for re-use and is costly to replace.

The assembly provided by this invention assists the removal of the wire from stored packaging and helps deliver the wire to a wire feed by modifying the cast from the sine wave of the stored wire before it forms into a helical coil and presents problems. This device is especially useful for transferring long segments of wire, sometimes as long as up to one hundred feet long.

The device provides a simple system to provide straight wire to a welding gun and in addition allows the positioning of the plastic conduit in which it is carried throughout the manufacturing facility, in and around the equipment found in the conventional manufacturing situation so that the wire does not provide an unsafe condition in the manufacturing facility. The patentee is not aware of any such assembly in use today.

SUMMARY

Thus, what is disclosed and claimed herein is an assembly for moving wire from one point to a second point distant from the first point. The assembly comprises a first unit comprising a wire straightener wherein the wire straightener is comprised of a mounting plate, the plate having a front flat surface, a back flat surface, a rearward edge, and a forward edge.

There is a mounting means mounted on the front flat surface and near the rear edge, the mounting means having a centered opening through it. The opening contains fixed therein, a hollow inlet guide tube. The tube extends through the opening such that it extends rearwardly and forwardly of the mounting means.

There is a wire guide sheave mounted to the front flat surface such that the bottom edge of the wire guide sheave contacts a wire being processed through the unit.

There is a first roll straightener sheave mounted on the front flat surface and beneath the wire guide sheave. The first roll straightener has a centered axle.

There is a vertically adjustable center sheave roller mounted on the front flat surface and forward of the first roll straightener sheave and a second roll straightener sheave mounted on the front flat surface and forward of the adjustable center sheave. The sheave has a centered axle. The first roll straightener sheave axle and the second roll straightener sheave axle are linearly aligned. There is a slotted vertical opening near the front edge of the mounting plate.

There is a second unit comprising a wire drive, puller and driver, said wire drive puller and driver having a housing mounted on a back plate.

The housing has a front wall and a rear wall and there is an opening centered in the front wall and the rear wall, each opening having a guide bushing therein. The front bushing has mounted therein an outlet guide tube wherein the outlet guide tube extends rearwardly and forwardly of the guide bushing.

Contained in the second unit housing is an idler drive roll and a driven drive roll, the idler roll and the drive roll both have centered axles. The idler roll and drive roll contact each other on a portion of the outer circumferential surfaces.

The second unit housing is mounted on a base, which surmounts a mounting block having a bottom surface, wherein the mounting block has two slotted openings through it. There is a pair of bolts threaded into the bottom surface of the base.

The mounting block is extended to and behind the back surface of the first unit mounting plate. The mounting block has an extension detachedly attached to the back surface of the first unit mounting plate by fasteners through the slotted vertical opening near the front edge of the first unit mounting plate.

In a second embodiment, there is a method of moving wire from one point to a second point that is distant from the first point using the assembly as described Supra. The method comprises employing an assembly as discussed Supra and as a first step, providing a storage unit containing coiled wire.

One then moves a lead end of the stored wire into the inlet guide tube of the first unit and thereafter moves the wire under the wire guide sheave, over a circumferential surface of the first roll straightener sheave, under a circumferential surface of the adjustable center sheave roller, over a circumferential surface of the second roll straightener sheave to modify the cast of the wire, and then, into the guide bushing of the rear wall of the second unit, between circumferential surfaces of the idler drive roll and the driven drive roll, into the outlet guide tube, into a plastic conduit, said plastic conduit being of a length to carry the wire internally to a welding gun being used some distance from the wire storage unit.

The second unit is then allowed to provide the wire through the conduit to the welding gun at a predetermined rate provided by the second unit.

"Sheave" as used herein is a wheel or roller with a groove in its circumferential surface for guiding a belt, rope, wire or cable.

BRIEF DESCRIPTION OF THE DRAWINGS

FIG. 1 is a full side view of an assembly of this invention wherein for purposes of description in this specification, the forward end is on the left.

FIG. 2 is a full top view of the mounting block of the second unit of the assembly.

DETAILED DESCRIPTION

The present embodiments will now be described more fully hereinafter with reference to the accompanying drawings, in which some embodiments are shown. The subject matter of the present disclosure, however, may be embodied in many different forms and should not be construed as limited to the embodiments set forth herein. Rather, these embodiments are provided so that this disclosure will be thorough and complete, and will fully convey the scope of the subject matter to those skilled in the art. In the drawings, like numbers refer to like elements throughout.

The assembly is comprised of two units working in combination, namely, a first unit 1 which is a straightener and a second unit 2 which is a wire drive puller and driver.

The wire straightener 1 is comprised of a mounting plate 3 which is used to mount the components of the first unit in a predetermined manner, namely, such that the components are linearly aligned from right to left (the direction of the flow of the wire being processed through the unit). The mounting plate 3 is also used to stabilize the various components of the first unit 1.

The mounting plate 3 has a front flat surface 4, a back flat surface 5 (not visible in this Figure), a rearward edge 6 (to the right) and a forward edge 7 (to the left).

There is a mounting means 8 for mounting a wire guide 9. The mounting means 8 is mounted on the front flat surface 4 and near the rear edge 6. The mounting means 8 has an opening 43 through it, the opening 43 containing a hollow inlet guide tube 10. The tube 10 extends forwardly and rearwardly such that it extends beyond the mounting means 8.

There is a wire guide sheave 11 mounted to the front flat surface 4 such that the bottom edge 12 of the wire guide sheave 11 contacts a wire 14 that is being processed through the unit.

The wire guide sheave 11 has a centered axle 15 such that allows it to rotate in the direction opposite of the forward path of the wire 14.

There is a first roll straightener sheave 16 mounted on the front flat surface 4 and beneath the wire guide sheave 11 such that the wire guide sheave 11 maintains the wire 14 essentially level with the top of the circumferential surface 17 of the first roll straightener sheave 16. By this, it is meant that the wire 14 at this point is maintained such that it does not have a significant hooped portion. The first roll straightener sheave 16 also has a centered axle 21 that allows it to rotate in the direction of the forward path of the wire 14.

There is a vertically adjustable center sheave roller 18 mounted on the front flat surface 4 and forward of the first roll straightener sheave 16. This sheave 18 has a centered axle 22 that will allow rotation of the sheave 18 opposite of the travel of the wire 14. The sheave 18 is adjustable in a vertical manner, such that the wire 14 maintains contact with the first roll straightener sheave 16 and with the second roll straightener sheave 19. This action of the sheaves 16, 18, and 19 applies pressure in the shown configuration, to the wire 14, and modifies the cast of the wire 14 such that it is essentially straightened.

The second roll straightener sheave 19 is mounted on the front flat surface 4 and forward of the adjustable center sheave 16. The sheave 19 has a centered axle 20 that allows it to rotate in the direction of the forward path of the wire 14. At this point, as the wire 14 leaves the second roll straightener sheave 19, it forms a slight hooped configuration 23, but owing to the fact that the wire 14 has been straightened, there are no significant problems associated with the formation of such a hooped configuration 23 at this point. Furthermore, the hooped configuration allows for flexibility to adjust the level of the wire 14 in the first unit 1 to be essentially level with the opening 13 in the back 24 of the wire drive, puller and driver 2.

It should be noted that the axles 20 and 21 are linearly aligned so that the path of the wire 14 is aligned on the sheaves 16, 18, and 19.

The sheaves 16, 18 and 19 are generally made from some durable, but soft plastic or the like, that has ceramic, or the like embedded therein. The only critical aspect of the sheaves is that they do not severely abrade the metal wire 14 as it is being pulled across the sheaves; therefore, it is generally prudent to provide such sheaves as plastics with particles embedded therein to provide some modicum of friction for pulling purposes. Ultra High Molecular Weight polyethylene embedded with ceramic particles has been found useful, as has phenolic and urethane resins. Metal sheaves can be used herein, but there is a significant abrasion of the metal wire 14.

There is a slotted vertical opening 25 near the forward edge 7 of the mounting plate 3. This slotted vertical opening 25 is used in conjunction with the bolts 26 to adjust the second unit 2 for alignment with first unit 1.

The second unit 2 is a wire drive puller and driver, that is, this second unit 2 both pulls the wire 14 from first unit 1 and drives the wire 14 into the conduit 27 for transport.

The second unit 2 is comprised of a housing 33 that has a front wall 28 and a back wall 24. There is an opening 29 in the front wall 28 and an opening 13 in the back wall 24. Each opening 13 and 29 has a guide bushing in it, namely, 30 in the back wall 24 and 31 in the front wall 28. The bushing 31 has an outlet guide tube 32 through which the wire 14 passes and is guided thereby. It should be noted that the outlet guide tube 32 extends beyond the bushing 31, rearwardly and forwardly. The outlet guide tube 32 has attached to it, a plastic conduit 27, which is the conduit that the wire 14 is transported through to its end use in the welding gun. The conduit for purposes of this invention can be any flexible conduit, but it is preferred to use plastic, or elastomer materials that will provide protection against abrasion of the metal as it slides through the conduit.

Contained in the second unit housing 33, is an idler drive roll 34 and a driven drive roll 35, the idler roll 34 and the drive roll 35 each having centered axles, 36 and 37 respectively, that allow the respective rolls to rotate, the idler roll 34 in a direction opposite to the forward movement of the wire 14, and the drive roll 35 in a direction consistent with the movement of the wire 14.

It should be noted that the idler roll 34 and the drive roller 35 intimately contact each other in order to provide pressure on the wire 14 to create enough friction to move the wire 14 forward. The contact, obviously, is between the rollers circumferential surfaces.

The second unit 2 is mounted on a base 38, which surmounts a motor mounting block 39, having a bottom surface 40, wherein the mounting block 39 has two slotted, parallel openings 41.

With reference to FIG. 2, there is shown a top view of the mounting bock 39 showing two slotted openings 41. In addition, the mounting block extension 42 is shown with a bolt 26, the extension mounting behind the mounting plate 3 and the bolts 26 fastening through the slotted opening 25 in the forward edge 7 of the mounting plate 3.

Turning now to the other embodiment of this invention which is a method of moving wire from one point to a second point distant from the first point, the method comprises employing an assembly as discussed just Supra.

For the method, there is provided a storage unit containing coiled wire which can be purchased commercially. One then moves a lead end of the stored wire into the inlet guide tube of the first unit.

Thereafter, the wire is pulled under the wire guide sheave, over a circumferential surface of the first roll straightener sheave, under a circumferential surface of the adjustable center sheave roller, over a circumferential surface of the second roll straightener sheave to modify the cast of the wire, and then, into the guide bushing of the rear wall of the second unit, between circumferential surfaces of the idler drive roll and the driven drive roll, into the outlet guide tube, into a plastic conduit, said plastic conduit being of a length to carry the wire internally to a welding gun being used some distance from the wire storage unit.

Thereafter, allowing the second unit to provide the wire to the welding gun at a predetermined rate provided by the second unit.

Although electrical motors can be used, it is preferred for second unit 2 to be an air driven system to power the drive motor attached to the drive roll 35. Using air eliminates the need for electrical interface/power to drive the unit and removes issues and regulations using power supply. It also allows usage in those areas of the World that do not have sufficient electrical energy sources to power such equipment. The air driven system also allows a positive load to be applied to the drive rolls while being stalled, without current or heat buildup. Stalling air motors (as opposed to electrical motors) has little to no effect on wear issues and can be regulated to offer the appropriate load.

It is to be noted that the wire 14 is forced through a series of three specific plastic (ultra-high molecular weight polyethylene) reinforced with ceramic fiber wheels that mechanically yield the wire 14 to force it to take the shape or cast of the wheel in the series of three.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are in the tended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Thus, the claims set forth below should be construed in view of the full breadth and spirit of the present disclosure as described herein.

What is claimed is:

1. An assembly for moving wire from a wire storage unit to a welding gun, comprising:
   a first unit comprising a wire straightener, said wire straightener having:
      a hollow inlet guide tube for receiving said wire from said wire storage unit a wire guide sheave mounted in the first unit such that a bottom edge of the wire guide sheave contacts a wire being processed through the unit;
      a first roll straightener sheave rotatably mounted in the first unit beneath the wire guide sheave;
      a center sheave rotatably mounted in the first unit forward of the first roll straightener sheave;
      a second roll straightener sheave rotatably mounted forward of the center sheave;
      said first roll straightener sheave and said second roll straightener sheave having linearly aligned axes of rotation;
   a second unit comprising a wire drive, puller and driver, said wire drive puller and driver having a housing with first and second openings, each of said first and second openings having a guide bushing therein, one of the bushings having mounted therein an outlet guide tube, said outlet guide tube extending rearwardly from said housing; and
   an idler drive roll and a driven drive roll rotatably mounted within the second unit housing, said idler roll and said drive roll contacting each other on a portion of their respective outer circumferential surfaces;
   the second unit housing mounted on a mounting block, the mounting block being removably attached to a mounting plate of the first unit by a fastener positioned in a slotted vertical opening in the mounting plate.

2. The assembly of claim 1, wherein the center sheave roller is vertically adjustable with respect to the axes of rotation of the first roll straightener sheave and the second roll straightener sheave.

3. The assembly of claim 1, wherein at least one of the wire guide sheave, the first roll straightener sheave, the center sheave roller and the second roll straightener sheave comprise ultra-high molecular weight polyethylene reinforced with ceramic fiber.

4. The assembly of claim 1, wherein the fastener comprises first and second fasteners and the slotted vertical opening comprises first and second vertical openings.

5. The assembly of claim 4, the position of the second unit relative to the first unit being adjustable by adjusting the position of the fasteners in the slotted vertical openings in the mounting plate.

6. The assembly of claim 1, wherein the housing is mounted on a back plate, the housing having a front wall and a rear wall, the first opening centered in the front wall and the second opening centered in the rear wall.

7. The assembly of claim 1, wherein the outlet guide tube is coupled to a flexible conduit, the flexible conduit for guiding the wire to the welding gun.

8. The assembly of claim 7, wherein the flexible conduit comprises a plastic or elastomeric material.

9. The assembly of claim 1, wherein at least one of the wire guide sheave, the first roll straightener sheave, the center sheave roller and the second roll straightener sheave comprise a wheel or roller with a groove in its circumferential surface for guiding the wire.

10. A method of moving wire from a wire storage unit to a welding gun, comprising:
   drawing a wire from a storage unit; moving the wire through an inlet guide tube;

moving the wire under a wire guide sheave, over a first roll straightener sheave, and under a center sheave roller;

moving the wire over a second roll straightener sheave to modify a cast of the wire, moving the wire into a guide bushing, moving the wire between circumferential surfaces of an idler drive roll and a driven drive roll, and moving the wire through an outlet guide tube and through a conduit, the conduit carrying the wire internally to a welding gun.

11. The method of claim 10, comprising providing the wire to the welding gun at a predetermined rate from the second unit.

12. The method of claim 10, wherein the inlet guide tube, the wire guide sheave, the first roll straightener sheave, the adjustable center sheave roller and the second roll straightener are provided as part of a first unit.

13. The method of claim 10, wherein the guide bushing, the idler drive roll and the driven roll are provided as part of a second unit coupled to the first unit.

14. The method of claim 10, wherein moving the wire over the first roll straightener sheave comprises contacting the wire with a circumferential surface of the first roll straightener.

15. The method of claim 10, wherein moving the wire under the center sheave roller comprises contacting the wire with a circumferential surface of the center sheave roller.

16. The method of claim 10, wherein moving the wire over the second roll straightener sheave comprises contacting the wire with a circumferential surface of a second roll straightener sheave.

17. The method of claim 10, wherein the center sheave roller is vertically adjustable with respect to the first and second roll straightener sheaves.

18. The method of claim 10, wherein moving the wire through an outlet guide tube and through a conduit comprises carrying the wire to the welding gun positioned a distance from the wire storage unit.

19. The method of claim 10, wherein at least one of the wire guide sheave, the first roll straightener sheave, the center sheave roller and the second roll straightener sheave comprise ultra-high molecular weight polyethylene reinforced with ceramic fiber.

* * * * *